June 2, 1953 — N. H. PREBLE ET AL — 2,640,711
TRACTOR DRAWBAR AND DRIVE SHAFT BEARING ASSEMBLY
Filed Oct. 10, 1949 — 3 Sheets-Sheet 1
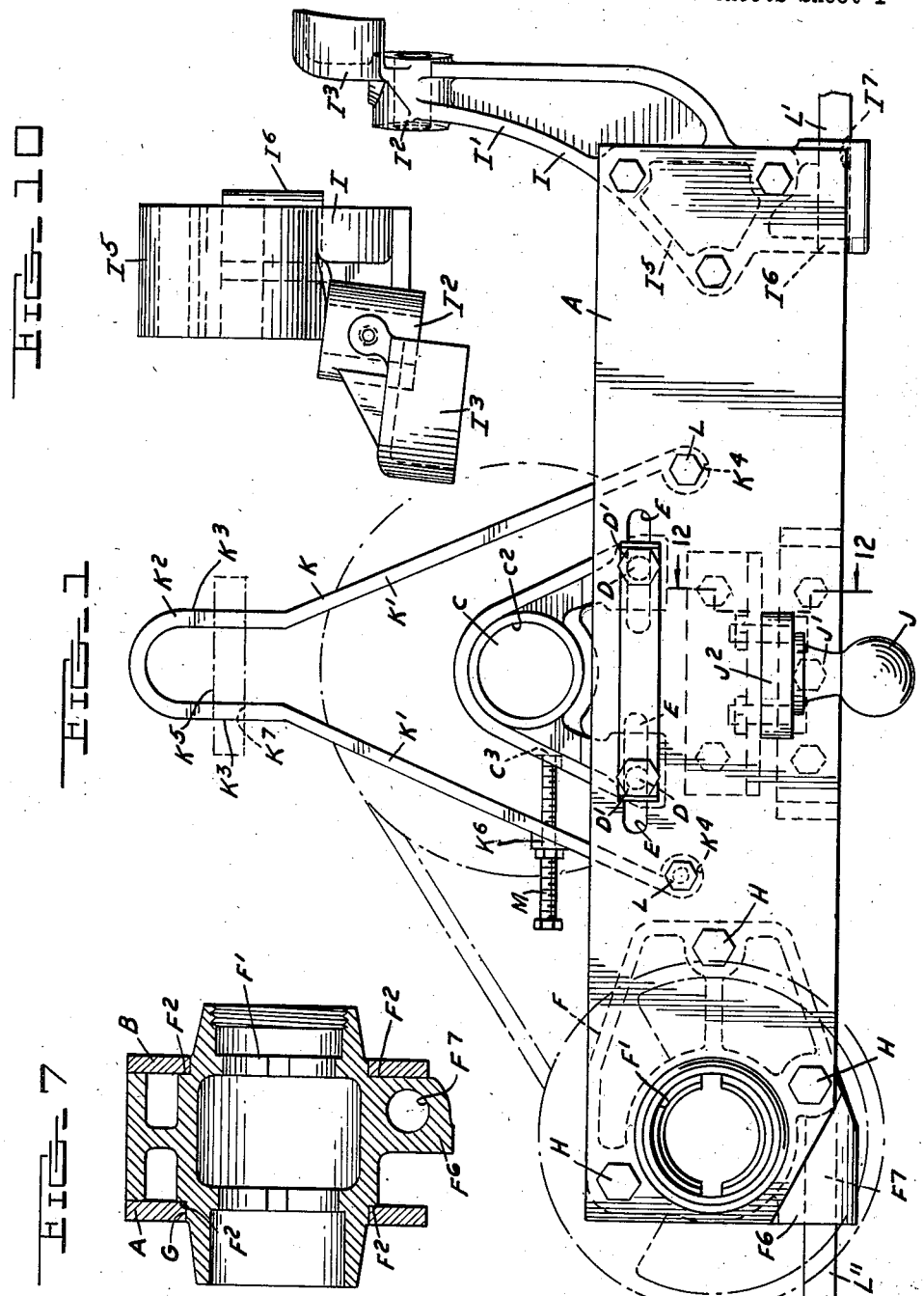
INVENTOR.
NORMAN H. PREBLE
WILLIAM A. GOSS
BY
Whittemore Hulbert + Belknap
ATTORNEYS

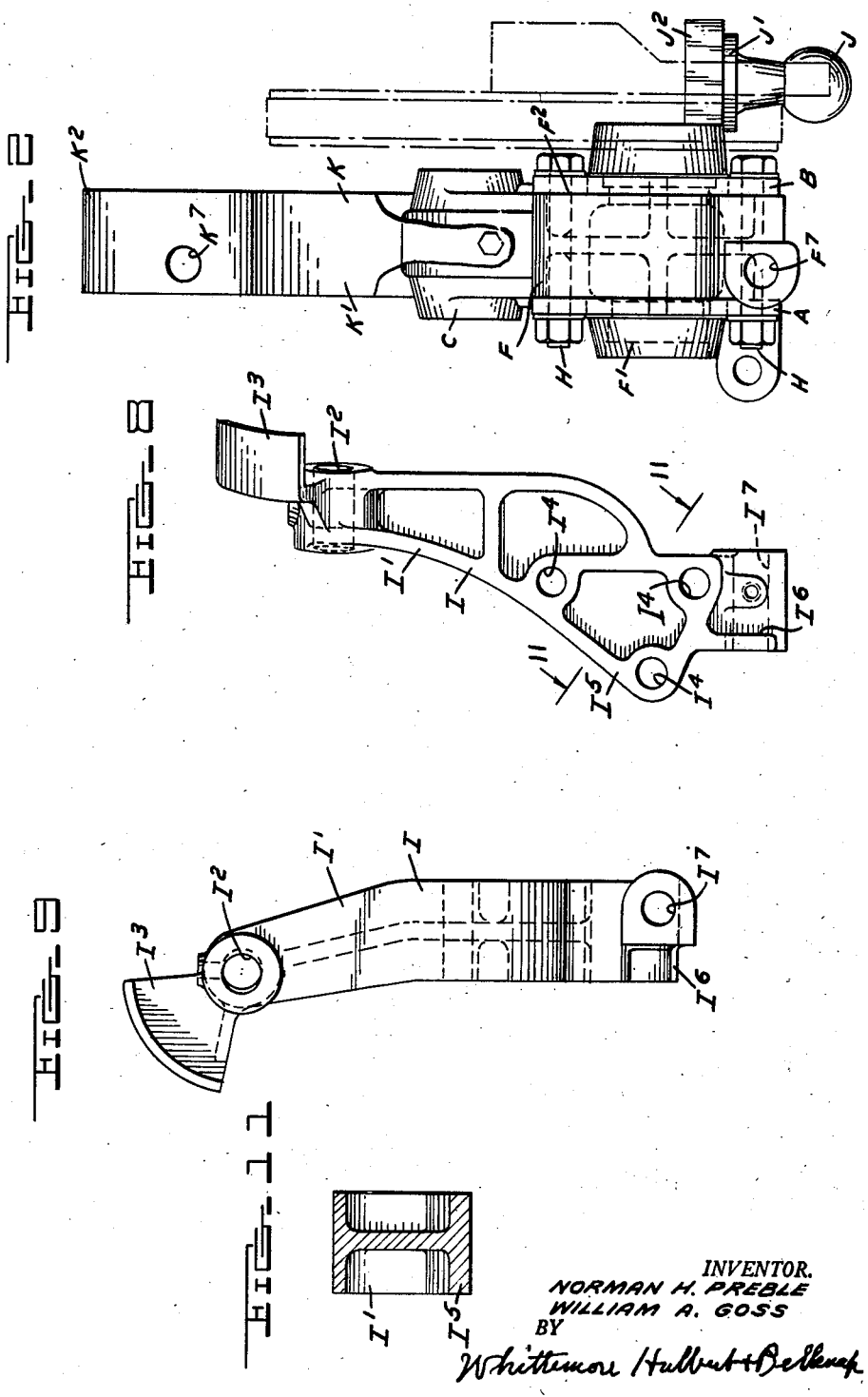

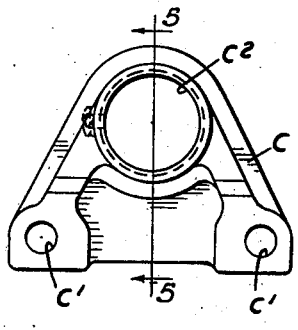
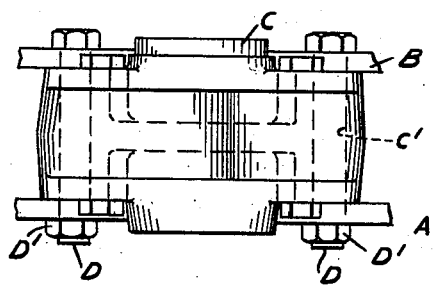
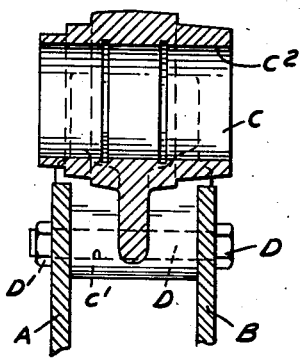
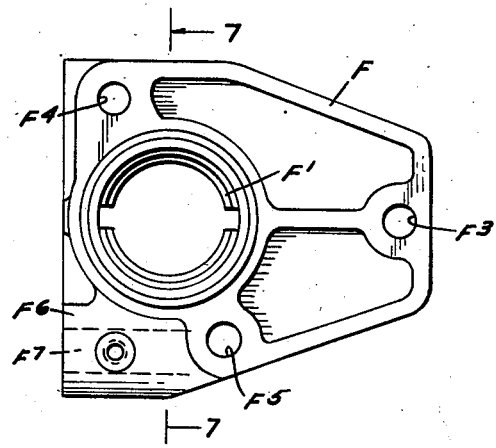
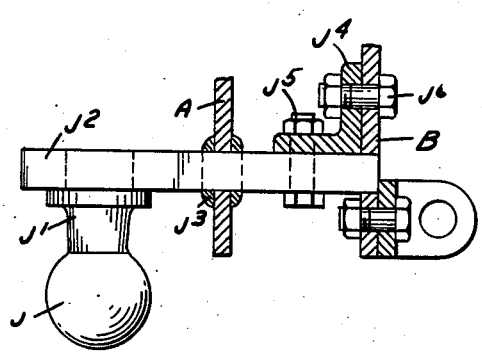

Patented June 2, 1953

2,640,711

UNITED STATES PATENT OFFICE 2,640,711

TRACTOR DRAWBAR AND DRIVE SHAFT BEARING ASSEMBLY

Norman H. Preble, Grosse Pointe, Mich., and William A. Goss, Zanesville, Ohio, assignors to Detroit Harvester Company, Detroit, Mich., a corporation of Michigan Application October 10, 1949, Serial No. 120,468

9 Claims. (Cl. 280—33.44)

The invention relates to draw bar attachments to tractors for connection with agricultural implements, such as a mower, and for supporting the operating mechanism therefor.

It is the object of the invention to obtain a construction which affords rigid support for the mechanism and attachments mounted thereon and which, at the same time, permits of the replacement of broken or inoperative portions without affecting other portions, or the necessity of replacing the whole structure.

To this end the invention consists in the construction as hereinafter set forth.

In the drawings:

Fig. 1 is an elevation of the draw bar as viewed from the rear;

Fig. 2 is an end elevation thereof;

Fig. 3 is an elevation of one of the separate units for forming the draw bar and which constitutes a bearing for the main driving shaft;

Fig. 4 is a plan view thereof assembled with adjacent elements;

Fig. 5 is a section on line 5—5, Fig. 3, assembled;

Fig. 6 is an elevation of another unit constituting a countershaft bearing;

Fig. 7 is a section thereon on line 7—7, Fig. 6, with the plates attached;

Figs. 8, 9 and 10 are, respectively, a side elevation, end elevation and plan view of another unit;

Fig. 11 is a cross section on line 11—11, Fig. 8; and

Fig. 12 is a section on line 12—12, Fig. 1, showing another unit.

Our improvement relates solely to the draw bar proper and not the mechanism mounted thereon. For that reason it is unnecessary to describe such mechanism which is of a general type well known in the art. However, the draw bar must be provided with suitable mountings for such mechanism which in certain constructions of the prior art have been formed of a single integral casting. A serious objection to such integral structure is that if one portion thereof is broken or injured, it may be necessary to discard the whole.

The most characteristic feature of our improvement is that it is composed of a plurality of separately formed units secured to each other to form a rigid structure but capable of being disassembled to replace a part if necessary. Such units include a bearing for the main drive shaft connected to the power take off of the tractor, also a bearing for a transmission or countershaft, an upwardly extending bracket for supporting a pulley in the counterbalancing means, a connection for the drag link and other parts more specifically referred to hereinafter.

In general construction our improved draw bar includes a pair of spaced parallel plates between which the various units are placed and to which they are rigidly secured. These plates A and B are oblong in shape and are of sufficient thickness to afford the necessary rigidity. A unit C forming the bearing for the main shaft is placed between the central portions of said plates and is secured thereto by bolts D. As shown in Fig. 1, the unit C is of substantially triangular shape having parallel front and rear surfaces for bearing against the plates A and B and forming a spacer therefor. The bolts D are located in the opposite end portions of the base of the triangle and pass through apertures C' therein. The upper portion of the triangle extends above the upper edges of the plates and has formed therein a bearing $C^2$ for the main drive shaft. The bolts D project beyond opposite sides of the member C and pass through horizontally extending slots E in the plates. Nuts D' engaging threaded end portions of the bolts D rigidly clamp the unit C to said plates but provide for longitudinal adjustment that will be later explained. F is a unit having formed therein a bearing F' for a countershaft. This unit is located at the left end of the draw bar, as viewed from the rear, and has its bearing portion F' arranged centrally of the plates A and B and passing through apertures G therein. The main body of the unit F has front and rear faces spaced from each other, the same as in unit C, and forming a portion $F^2$ to bear against the plates A and B. This main portion extends inward of the bearing F' and has a bolt receiving aperture $F^3$ therein. There is also a bolt aperture $F^4$ located above the bearing F' and another bolt aperture $F^5$ below said bearing. All of these apertures register with corresponding apertures in the plates A and B and bolts H passing therethrough serve to rigidly clamp the unit F to said plates. Below the bearing F' and to the left of the bolt aperture $F^5$ is a portion $F^6$ which has a horizontal bore $F^7$ therein for receiving and supporting an outwardly projecting pivot pin L'' for engagement of a link attached to the tractor.

At the opposite ends of the plates A and B, there is secured a unit I which has an upwardly extending bracket arm I'. At the upper end of the arm I' is a bearing $I^2$ forming a socket for a pin or shaft (not shown) on which a pulley is to be mounted. A segmental hood or guard I³ extends upward above the bearing I² to cover a portion of the pulley. The lower portion I⁵ of the unit I is of triangular shape and fits between the plates A and B. Bolt apertures I⁴ are located in the corner portions of this triangular part and register with corresponding apertures in the plates A and B to receive clamping bolts. Extending downward from the triangular portion I⁵ is a portion I⁶ having a horizontal bore I⁷ therein for receiving a pivot pin L' corresponding to the one in the unit F. These pins are usual in draw bars for attachment of pivotal links extending to the tractor. All of the units C, F and I are preferably formed of castings which are suitably ribbed to strengthen the same with comparatively light weight.

In addition to the units thus far mentioned, there is a ball member J for a universal joint connection with the drag link (not shown). This member J has a shank portion J' depending from and rigidly secured to (preferably by welding) a bar member J². The latter is of an oblong cross section and extends through registering apertures of a similar shape in the plates A and B, which are located at the center thereof below the unit C. The bar J² is rigidly attached to the plate A by welding, as indicated at J³, but its forward end slidably engages the aperture in the plate B. It is, however, rigidly secured to the plate B by an angle member J⁴ and bolts J⁵ and J⁶, respectively, engaging the bar J² and the plate B. With such construction the bar J² is rigidly connected to the plates A and B while permitting of assembly and disassembly of the latter.

For lifting the draw bar (by mechanism on the tractor) there is provided a lifting strap K. This is formed from a bar of a width equal to the space between the front and rear plate, which is bent into an inverted V-shaped portion K' with a return bent portion K² at its upper end connected to the V-portion by parallel portions K³, and K⁴ are eye portions at the opposite lower ends of the V-portion. A pin K⁵ extends across between the portions K³ engaging apertures K⁷ therein which are located at one side of the center of the bar. This strap member embraces the unit C and the eyes K⁴ are connected by bolts L to the front and rear plates A and B.

It has been stated that the unit C is secured by bolts D passing through horizontally extending slots E in the plates A and B to permit of adjustment. The purpose of this adjustment is to tighten a belt transmission between pulleys, respectively, on the drive shaft and countershaft. Such adjustment is facilitated by providing the strap K with a lug K⁶ welded to the outside of one of the V-shaped portions. This lug is provided with a threaded bore for engaging an adjusting screw M, which extends into engagement with a recessed bearing C³ in the unit C. Thus after loosening the nuts D', the screw M may be adjusted to move the bearing C and its bolts D longitudinally of the slots E. When properly adjusted the nuts D' are tightened to hold said member in rigid relation to the frame.

The construction as above described is one which can be manufactured at relatively low cost and, when the units are assembled with the plates A and B and suitably clamped, the structure will be as rigid as an integral construction. It has, however, the marked advantage that if any one of the units is broken or injured it can quickly be detached and replaced by another corresponding unit.

What we claim as our invention is:

1. A draw bar comprising registering front and rear transversely extending parallel spaced plates, and a plurality of separately formed units clamped between said plates, said units including a centrally located bearing for a drive shaft, a countershaft bearing located near one end of said plates and a bracket member located at the opposite end of said plates and extending upward therefrom, the members at opposite ends of said plates being rigidly secured thereto and said central bearing being adjustably secured.

2. A draw bar comprising registering front and rear transversely extending parallel spaced plates, and a plurality of separately formed units clamped between said plates, said units including a centrally located bearing for a drive shaft, clamping bolts for said bearing engaging slots in said front and rear plates, a lifting strap member embracing said bearing and extending between said plates being secured thereto at its lower ends, said strap having a lug on one side thereof with a threaded aperture therein, and an adjusting screw engaging said threaded aperture and abutting against said bearing, forming a means of adjusting the latter.

3. A mechanism supporting draw bar for attachment to tractors of implements operated thereby comprising registering front and rear transversely extending parallel spaced plates, a plurality of separately formed units clamped between said plates constituting spacers therefor to form therewith a rigid structure, a ball member for connection with an implement drag link, a bar to which said ball is rigidly secured extending through registering apertures in said rear and front plates and welded to the former, and detachable means for rigidly securing said bar to said front plate when engaged with the aperture therein.

4. A draw bar comprising a pair of horizontally elongated vertically disposed plates having registering openings adjacent one end, a bearing unit received between said plates and having extensions received in the openings and shoulders at the inner ends of said extensions against which the inner surfaces of said plates bear to provide predetermined spacing between said plates, said bearing unit and plates having registering openings spaced outwardly from the axis of said bearing unit, and fastening members extending through said last named registering openings.

5. A draw bar as defined in claim 4 in which said bearing unit is provided with a horizontal bore facing toward the adjacent end of said draw bar, and a pivot pin having one end received in said bore and its outer end extending outwardly beyond the adjacent ends of said plates.

6. A built-up draw bar assembly comprising a pair of horizontally elongated vertically disposed plates having aligned openings adjacent one end, a first bearing unit having a spacer portion received between said plates and extensions received in said openings, removable fastening elements connecting said plates and bearing unit, a spacer intermediate the opposite ends of said plates, a second bearing unit having a lower portion received between the central portions of said plates and a bearing portion extending above said plates, said lower portion having bolt receiving openings therethrough, said plates having bolt-receiving openings registering with the bolt-receiving openings in the lower portion of said second bearing unit, one of said bolt-receiving openings being elongated in the direction of the length of said plates to provide for longitudinal adjustment of said second bearing unit, and removable fastening elements extending through said bolt-receiving openings.

7. A built-up draw bar assembly comprising a pair of horizontally elongated vertically disposed plates, a removable combined bearing unit and spacer including a portion received between said plates adjacent one end thereof, a removable combined bracket unit and spacer including a portion received between said plates adjacent the opposite end thereof and a bracket portion extending above said plates, a second bearing unit including a base portion received between the central portions of said plates for adjustment longitudinally thereof and a bearing portion extending above said plates.

8. A built-up draw bar assembly comprising a pair of horizontally elongated vertically disposed plates, a removable combined bearing unit and spacer including a portion received between said plates adjacent one end thereof, a removable combined bracket unit and spacer including a portion received between said plates adjacent the opposite end thereof and a bracket portion extending above said plates, a second bearing unit including a base portion received between the central portions of said plates for adjustment longitudinally thereof and a bearing portion extending above said plates, a lifting strap connected to said plates and having an upper portion extending above said plates in proximity to the bearing portion of said second bearing unit, an adjustment screw carried by the upper portion of said lifting strap and engageable with the side of said second bearing unit adjacent said first bearing unit.

9. A built-up draw bar assembly comprising a pair of horizontally elongated vertically disposed plates, a removable combined bearing unit and spacer including a portion received between said plates adjacent one end thereof, a removable combined bracket unit and spacer including a portion received between said plates adjacent the opposite end thereof and a bracket portion extending above said plates, the spacer portions of both of said units having horizontal pin-receiving openings therein facing outwardly toward the ends of said draw bar, and pins having their inner ends received in said pin-receiving openings and outer ends extending outwardly beyond the ends of said plates.

NORMAN H. PREBLE.
WILLIAM A. GOSS.

References Cited in the file of this patent

UNITED STATES PATENTS

| Number | Name | Date |
|---|---|---|
| 1,423,550 | Filen | July 25, 1922 |
| 1,659,989 | Bloss et al. | Feb. 21, 1928 |
| 1,942,637 | Best | Jan. 9, 1934 |
| 2,050,518 | Baumgardner | Aug. 11, 1936 |
| 2,052,294 | Hilblom | Aug. 25, 1936 |